Aug. 18, 1959  J. F. SKELLY  2,900,330
FLUIDIZED SOLIDS HYDROCARBON CONVERSION SYSTEM WITH
AN IMPROVED SOLIDS TRANSFER BETWEEN
THE REACTION AND STRIPPING ZONES
Filed Nov. 12, 1954

INVENTOR.
JOSEPH F SKELLY
BY
ATTORNEYS

United States Patent Office 2,900,330
Patented Aug. 18, 1959

2,900,330

FLUIDIZED SOLIDS HYDROCARBON CONVERSION SYSTEM WITH AN IMPROVED SOLIDS TRANSFER BETWEEN THE REACTION AND STRIPPING ZONES

Joseph F. Skelly, New York, N.Y., assignor to The M. W. Kellogg Company, Jersey City, N.J., a corporation of Delaware Application November 12, 1954, Serial No. 468,359

5 Claims. (Cl. 208—164)

This invention relates to improved method and means for transferring finely divided solid material directly from one dense fluidized bed to another, and more particularly, it pertains to improved method and means in a hydrocarbon conversion system for transferring spent catalytic material directly from the reactor to the stripper.

This application is a continuation-in-part of S.N. 280,107, filed April 2, 1952, now abandoned.

It has been suggested heretofore to transfer spent catalyst from the dense bed in a reaction zone directly to the dense bed in a stripping zone by passing the same through an opening in a vertical partition which serves to maintain the two beds separated. It was found that such a technique resulted in a significant quantity of a gaseous reactant being occluded with the outgoing catalyst from the reaction zone, and thereby undesirably mixing with the stripper bed with consequent loss in stripping efficiency, and a portion of the stripping gas and stripped catalyst backflowing into the reaction zone. The flow of catalyst was also erratic, thus pointing to the need for improvement in this type of design. The present invention is concerned with method and means whereby the disadvantages mentioned are substantially overcome.

It is contemplated by means of this invention to provide a method of transferring finely divided solids from one dense fluidized bed directly to another which comprises a primary dense bed separated from a secondary dense bed by means of a substantially vertical partition, each of said beds being maintained in a fluidized condition by upflowing primary and secondary gasiform materials in the respective beds, deflecting a portion of said primary gasiform material adjacent to the vertical partition in said primary bed such that at least partial defluidization of solids occurs and they flow downwardly along the partition, passing the defluidized finely divided material obliquely downwardly at an angle greater than the angle of repose of the solids through an opening in said vertical partition above the point of deflection of said primary gasiform material, said opening in the partition being situated at a level such that the total pressure in the primary bed is greater than the total pressure in the secondary bed, and the defluidized material flows into said secondary bed and intermixes therewith.

In another aspect, it is contemplated providing an apparatus comprising in combination a vessel means adapted to contain a dense fluidized bed of finely divided material, a vertical partitioning means situated within said vessel means thus dividing said vessel means into primary and secondary zones, each zone adapted to contain a dense fluidized bed of solid materials, at least one opening in said partitioning means, fluid means for introducing separate fluid streams to each of said primary and secondary zones for upward passage therein, baffle means projecting laterally from said partitioning means below the opening therein, and adapted to deflect a portion of said fluid flowing upwardly along the partitioning means, and oblique downflow means associated with said opening and adapted to provide the flow of finely divided solids from the primary zone obliquely downwardly at an angle greater than the angle of repose for entry into said secondary zone.

The present invention is applicable to any type of system in which it is desired to pass finely divided solid material directly from one dense fluidized bed to another. This includes any system in which a chemical reaction or contact between gasiform material and finely divided solids is effected, however, notably, it is applicable to a hydrocarbon conversion system in which the finely divided catalytic material becomes contaminated with carbonaceous material and volatile hydrocarbons, and it is necessary to provide a preliminary treatment to strip volatile hydrocarbons therefrom prior to subjecting the same to a regeneration treatment. In this connection, the dense bed of catalyst in the stripper is situated adjacent to the dense bed of the reactor and separated therefrom by means of a vertical partition. For the purpose of this invention and the appended claims, the partition is positioned in a substantially vertical plane, however, it should be understood that deviation in the order of about −30° to about +30° from a true vertical position can be tolerated. The hydrocarbon conversion processes which can utilize the present invention are, for example, catalytic cracking, hydroforming, desulfurization, hydrogenation, isomerization, aromatization, polymerization, alkylation, etc. Among the various processes, which can use the present invention, the greatest application is with respect to fluid catalytic cracking. In fluid catalytic cracking, a high boiling hydrocarbon oil, e.g., gas oil, residual oils, e.g., reduced crude, vacuum tar, etc., is contacted with a suitable cracking catalyst such as, for example, a siliceous material containing about 50 to about 100% of silica, more usually, about 70 to about 95% by weight of silica. In a plural catalyst, the silica is in combination with another cracking component, such as alumina, zirconia, boria, magnesia, etc.

The finely divided material to be used in the practice of this invention has a particle size of about 5 to about 150 microns, more usually, about 10 to about 100 microns. Such material readily fluidizes by passing gasiform material upwardly through a mass thereof at a superficial linear gas velocity of about 0.1 to about 6 feet per second, more usually, about 0.5 to about 2.5 feet per second, and, in most commercial operations, the velocity varies from about 1 to about 2 feet per second. For the purpose of this invention, the gasiform material can be either a material which is normally vaporous or normally gaseous. In the passage of the finely divided material from one dense bed to another, in accordance with the present invention, the catalyst is at least partially defluidized in order that significant reduction in the gasiform material content is effected prior to its transfer to the secondary mass of catalyst. As previously indicated, the defluidization effect is accompanied by deflecting through baffle means, etc., the upflowing gaseous material which is passing along the partitioning means. The greater the defluidization of the catalyst stream which is to flow into the secondary mass, the less intermixing of occluded gasiform material with the secondary mass is effected. The defluidization can be readily accomplished by means of techniques advanced hereinunder under the conditions obtaining in the respective processing zones between which catalyst is passing.

The high boiling hydrocarbon oil feed is cracked at a temperature of about 800° to about 1075° F., more usually, about 850° to about 950° F. The pressure of the cracking operation is about 0 to about 50 p.s.i.g., more usually, about 5 to about 20 p.s.i.g. The quantity of oil being processed relative to the catalyst which is present in the reaction zone measured as the weight space velocity, that is, the pounds of oil per hour being charged to the reaction zone per pound of catalyst present therein varies from about 0.25 to about 15, more usually, about 0.5 to 5. The catalyst to oil ratio, on a weight basis, varies from about 1 to 25, more usually about 5 to 15.

As a result of converting hydrocarbons, the contaminated catalyst contains carbonaceous material as well as sorbed and occluded volatile hydrocarbons. In order to reduce the loss of volatile hydrocarbons, the catalyst is first treated by means of a gasiform stripping agent, e.g., steam, flue gas, nitrogen, carbon dioxide, normally gaseous hydrocarbons, viz., methane, ethane, propane, etc., in a stripping zone for the removal of occluded and sorbed volatile hydrocarbons from the catalyst. The stripping operation can be conducted at the same temperature as the reaction temperature or it can be higher or lower than said temperature and falling within the range specified hereinabove for the cracking temperature. The variation in stripping temperature from the reaction temperature can be achieved by using a gasiform stripping agent at a higher or lower temperature of the catalytic material to be stripped.

The carbonaceous material contained on the catalyst is removed by combustion with an oxygen containing gas, e.g., air. The combustion is effected at a temperature of about 750° to about 1200° F., more usually, about 950° to 1150° F. The regeneration pressure varies in the same range as the pressure mentioned thereinabove for the cracking operation or, in general, it can be the same as the reaction pressure.

In the absence of any fluidizing agent or gas, settled or defluidized powder will flow downwardly only if the angle of downward flow is greater than the angle of repose. In the present invention, at least partial defluidization is relied upon to prevent back-flow of gaseous material and solids, and an angle of downward flow greater than the angle of repose is relied upon to insure flow in the desired direction. It being understood that the flow of defluidized solids is possible by reason that the total pressure in the primary mass, i.e., the mass from which flow is taking place, at the point of transfer is greater than the total pressure in the secondary mass, i.e., the mass into which flow is taking place. The difference in total pressure in the two beds governs the rate of flow therebetween and this pressure differential can be varied by changing the height of the masses and density thereof. Usually, the two masses will have about the same density, and as a practical matter the primary mass is maintained at a higher level than the secondary mass. However, it should be understood that the density of the fluidized masses can also serve as a means for controlling the rate of flow between the masses.

In the case where the partition contained merely an opening for passage of solids between the zones or beds, the solids were transferred substantially as portions of fluidized masses, hence, significant amounts of gasiform material were transferred with the solids. It was found that this disadvantage can be overcome significantly by defluidizing as much as possible the solids being transferred, hence, the ratio of gas to solids being passed is far less than merely having an opening in a partition for the passage of solids. The present process effects this purpose by providing a shielding baffle projecting a very short distance into the mass from the side wall, and preferably extended horizontally for a sufficient distance so as to shield the side wall from aeration, develop a substantial and continuous descending curtain of partial defluidized particles adjacent to the side wall, and to entrap this curtain over a sufficient horizontal length of the side wall to collect the desired quantity of particles. These particles may be flowed obliquely downward at an angle greater than the angle of repose without collecting on the baffle which has entrapped them. As previously indicated, fluidized powder may flow from one body to another of lower fluistatic pressure simply by providing at least one opening in a separating partition. However, it was found that such flow is erratic accompanied by backflow and consequent mixing between the two masses. In the secondary mass, the upflowing gasiform material along the partitioning means may interfere with the flow of solids from the primary mass or such gas may escape through the opening in the partition during the erratic flow of the solids. To prevent this from occuring, the opening is baffled from the upflowing gas, hence, there is less backflow and the solids flow more evenly by eliminating the interference caused by the gas. Further, by baffling the upflowing gases away from the opening in the partition in the secondary zone, solids are defluidized above the opening, and fall directly onto the stream of solids flowing from the primary zone. This phenomenon can interfere with the transfer of particles from the primary mass and therefore tend to disrupt the smooth flow thereof. It is another aspect of this invention to reduce this interference by shielding the opening in the partition such that the stream of defluidized particles flowing downwardly above the opening on the secondary side is deflected away from the partition and made to flow in the same direction as the stream of solids flowing from the primary mass.

The invention may be described in connection with its application to a fluidized catalytic cracking system in which it has unique advantages. However, it is to be understood that the invention can be used in a variety of processes other than the specific illustration to be given.

A specific embodiment of the invention is shown in the accompanying drawings in which.

Figure 1:
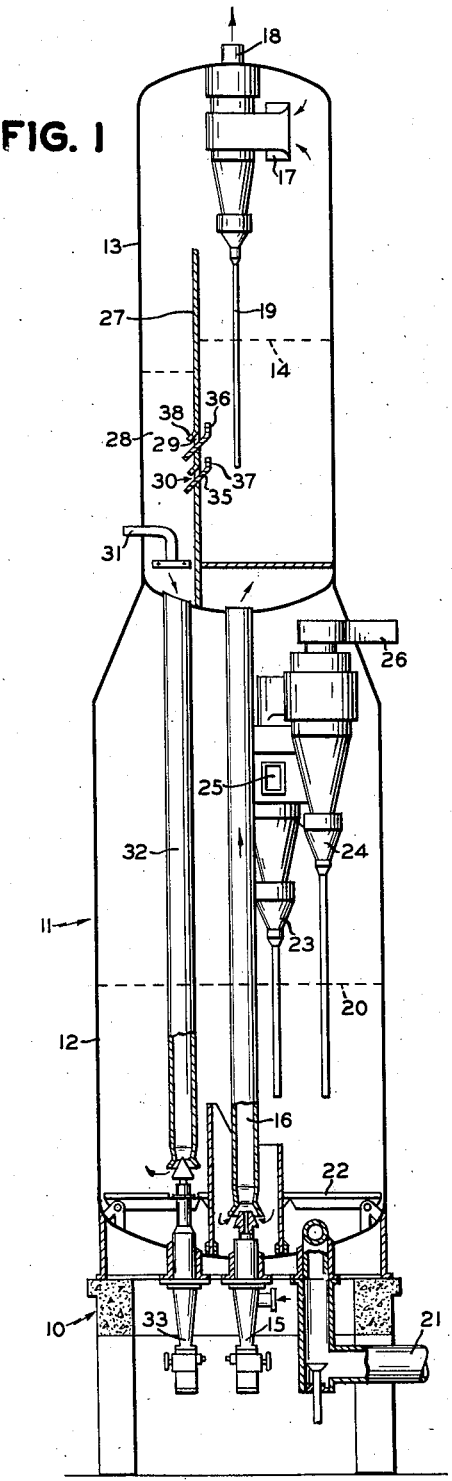
Figure 1 shows a petroleum catalytic cracking apparatus for cracking petroleum vapors in presence of powdered catalyst and continuously regenerating said catalysts.

In Figure 1, a foundation 10 supports a large unitary structure 11 comprised of a lower regenerating chamber or vessel 12 and a relatively smaller upper reactor chamber 13. This arrangement can be reversed to provide a superimposed regenerator in a vertical alignment with the reactor. A dense fluidized mass of finely divided catalytic cracking catalyst 14, e.g., silica-alumina, is maintained in the upper chamber 13. Liquid oil feed or vaporous feed is introduced through a hollow-stem plug valve located at the bottom of unitary structure 11, and indicated generally by the numeral 15. The oil feed passes upwardly through conduit 16 which is located within regenerator 12 and then it flows upwardly through reactor catalyst bed 14.

The oil feed is cracked and the resultant cracked product passes from the upper surface of catalyst bed 14, enters cyclone separator 17 and leaves the system through conduit 18. Separated catalyst in the cyclone 17 is returned to reactor bed 14 by way of dipleg 19.

It is necessary that spent catalyst of reactor bed 14 is circulated to the regenerator chamber 12 for regeneration treatment. Regeneration is effected by introducing regenerating gases, e.g., air, into the system by means of conduit 21, which is located below grid plate 22. The air is uniformly distributed by means of grid plate 22 for upward passage through regenerator catalyst and bed 20. Flue gas is discharged from the regeneration chamber by first entering cyclone separators 23 and 24 through inlet 25 for recovery of entrained fines and then flowing from the system at 26. Separated catalyst is returned to dense bed 20 by way of the diplegs of cyclone separators 23 and 24.

The catalyst which is withdrawn from the reactor bed 14 for transfer to the regeneration chamber 12 is purged of sorbed and occluded reaction product by means of an inert stripping gas, e.g., steam. In order to carry out this stripping step, a part of reaction chamber 13 is partitioned off by a vertical transverse baffle 27 welded to side walls and bottom and thereby providing a relatively small stripping zone or segmental well 28 opening to the upper region of chamber 13. Spent catalyst continuously flows obliquely downwardly from reactor bed 15 into the stripping zone 28 by way of the baffled slots 29 and 30, shown in detail in Figure 2. Stripping zone 28 contains a dense fluidized phase of catalyst undergoing stripping by means of upflowing steam introduced by way of distributor 31. Catalyst flow from reactor bed 14 to stripping zone 28 is insured by maintaining higher fluistatic pressure on the reactor side. This is effected by using roughly equivalent bed densities and maintaining a higher level in the reaction zone than for the catalyst in stripping zone 28. The location of baffled slots 29 and 30 is lower than the lowest level at which it is desired to operate reactor bed 14. One of the advantages of this invention over the ordinary overflow type is that the upper surface of reactor bed 14 may be raised or lowered a considerable distance without interrupting flow to stripping zone 28. Stripped catalyst from stripping zone 28 flows downwardly through vertical conduit 32 which serves as a standpipe. Flow of stripped catalyst into regeneration dense phase 20 is controlled by means of plug valve 33. Regenerated catalyst is transferred from the regenerator dense bed 20 to the reactor chamber 13 by means of upflow transfer line 16.

Figure 2:
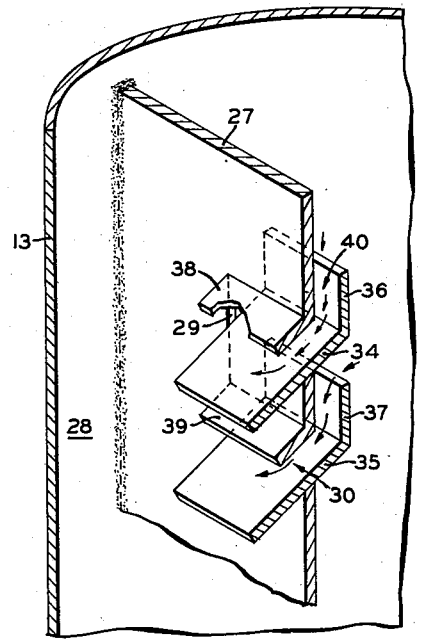
Figure 2 is a perspective view of a fragmentary section of a part of the apparatus in Figure 1 in which applicant's invention is employed.

Figure 2 is a sectional view of partition 27 containing baffled slots 29 and 30. The use of several baffled slots, e.g., one above the other, makes it possible to operate with a large flow of catalyst when reactor bed 14 is deep and at a high level and with a low rate of catalyst flow when this reactor bed 14 falls below one or more of the slots.

The lower edge of slots 29 and 30 are provided with baffle means or plates 34 and 35 which are tilted at an oblique plane downwardly in the direction of stripping zone 28, at an angle greater than the angle of repose of the catalyst being transferred. Baffles 34 and 35 extend a short distance into reactor bed 14, however, sufficient to reduce substantially aeration of that part of catalyst bed adjacent to partition 27 situated above slots 29 and 30. Hence, the baffle means 34 or 35 serve as oblique downward flow means and the lateral projection thereof serves as baffle means on each side of partition 27. The extension is, for example, a few inches in the typical case. Shielding and entrapping of solids by baffles 34 and 35 may be increased by the addition of vertical baffle edges or means 36 and 37, which extend vertically upwardly from the edge of baffles 34 and 35 on the primary side of the reactor, and serve to shield slots 29 and 30 from gaseous and solid material in proximity thereto. Vertical edges 34 and 35 may also enhance defluidization of the solids.

The upper edges of slots 29 and 30 are provided with sloping baffles or baffle means 38 and 39 which are parallel to baffles 34 and 35, and extend a short distance into stripping zone 28 from partition 27. These baffles serve to deflect defluidized catalyst which is descending along partition 27 within stripping zone 28, in the same direction of flow as the stream of catalyst from reactor bed 14. The direction of this flow is indicated by the arrows 40.

Baffles 34 and 35 have sufficient length, i.e., in the direction of flow indicated by arrows 40, to protect the flowing catalyst from gaseous material and hence prolong the defluidized condition. This effect tends to safeguard against reversal of flow. Also, the extension of baffles 34 and 35 into the stripping zone serves as baffle means for the upflowing stripping gases for the reasons indicated above.

In connection with the apparatus and operation described above in connection with Figures 1 and 2 of the accompanying drawing, the following specific example is furnished to provide a fuller understanding of the present invention:

Table

| | |
|---|---|
| Oil feed, b.p.d. | 3500. |
| Catalyst | Silica-alumina. |
| Reactor temperature, °F. | 900. |
| Reactor pressure, p.s.i.g. | 11.0. |
| Weight space velocity | 1.6. |
| Catalyst to oil ratio | 8.8. |
| Regeneration temperature, °F. | 1080. |
| Regeneration pressure, p.s.i.g. | 19.0. |
| Stripper temperature, °F. | 900. |
| Stripper pressure, p.s.i.g. | 11.0. |
| Reactor catalyst bed density, lbs./cu. ft. | 35. |
| Stripper catalyst bed density, lbs./cu. ft. | 35. |
| Length of slot 29 or 30 | Each 24". |
| Width of slot 29 or 30 | 2". |
| Length of baffle 34 or 35 | 8". |
| Angle of baffle 34 or 35 with horizontal plane | 45°. |
| Length of baffle 38 or 39 | 2". |
| Height of baffle 36 or 37 | 2". |
| Height of partition 27 | 16'. |
| Width of partition 27 | 5'. |
| Reactor diameter | 8'-6". |
| Reactor length | 30'. |

Having thus provided a description of my invention along with a specific example, no undue limitations or restrictions are to be imposed by reason thereof, but the present invention is defined by the appended claims.

I claim:

1. An improved method for handling finely divided solids within a vessel containing a reaction zone and a stripping zone positioned above a regeneration zone which comprises maintaining a dense fluidized bed of finely divided solids in said reaction zone and said stripping zone by passing gaseous material upwardly through each of said zones, said reaction zone and said stripping zone being separated by a common partition between said zones, maintaining a dilute phase of finely divided solids above said dense phase with an interface therebetween, said dilute phase being common to said reaction zone and said stripping zone, passing finely divided defluidized solids from said reaction zone to said stripping zone below the interface therein by passing said solids through an elongated passageway in said partition separating said zones in the absence of added fluidizing gas, said elongated passageway adapted to deflect the upward flow of gaseous material in said reaction zone to defluidize a portion of the dense fluidized bed of solids adjacent to said partition for flow through said elongated passageway, withdrawing stripped solids from the lower portion of said stripping zone and passing the same substantially vertically downwardly to the lower portion of said regeneration zone, and passing regenerated solids from the lower portion of said regeneration zone substantially vertically upwardly to the lower portion of said reaction zone.

2. In a hydrocarbon conversion process wherein a hydrocarbon reactant is passed through a dense fluidized bed of finely divided catalyst in a reaction zone to convert said hydrocarbon to desired products, thereby contaminating the catalyst with products of reaction and the contaminated catalyst is passed to a dense fluidized bed of catalyst in a stripping zone to remove products of reaction with a stripping gas and said stripping zone forms a part of said reaction zone and is separated from said hydrocarbon conversion section by a common partition in the lower portion of said reaction zone, the improved method for transferring catalyst from the dense fluidized catalyst bed employed in the reaction zone to the dense fluidized catalyst bed in the stripping zone, which comprises defluidizing a portion of the hydrocarbon conversion catalyst in the reaction zone adjacent to the partition, passing the defluidized catalyst downwardly along said partition and into an elongated passageway extending through said partition, into said stripping zone in the absence of added fluidizing gas, said passageway adapted to preclude backflow of catalyst from said stripping zone to said reaction zone through said passageway and withdrawing products of reaction and stripped products of reaction from the upper portion of said reaction zone.

3. In a system for transferring finely divided solids from a primary contact zone containing a dense fluidized bed of finely divided solids to a secondary contact zone containing a dense fluidized bed of finely divided solids, said contact zones being separated in the lower portion thereof by a substantially vertical common partition and in open communication with one another in the upper portion thereof, each of said beds being maintained in a dense fluidized condition by upflowing primary and secondary gasiform material in the respective beds, the improvement which comprises deflecting a portion of said primary gasiform material adjacent to said substantially vertical partition in said primary zone such that a portion of said finely divided solids therein are defluidized and flow downwardly along said partition, passing the defluidized finely divided solids through an L shaped opening in said vertical partition in the absence of added fluidizing gas, said elongated opening extending obliquely downwardly at an angle greater than the angle of repose of said solids above the point of deflection of said primary gasiform material, said opening in said partition being situated at a level in said dense fluidized bed of solids such that the total pressure in the primary bed is greater than the total pressure in the secondary bed, and the defluidized material flows into said secondary bed.

4. An apparatus comprising in combination an upper elongated chamber, a lower elongated chamber, said upper chamber divided in the lower portion thereof by a substantially vertical transverse partition into a first zone and a second zone, said first zone and said second zone being in open communication with one another in the upper portion thereof, a first substantially verical conduit connecting the lower portion of said first zone with the lower portion of said lower chamber, a second substantially vertical conduit connecting the lower portion of said second zone with the lower portion of said lower chamber, a plurality of elongated adjacently positioned slots in said partition, the upper edge of said slots formed by a downwardly sloping baffle extending into said second section and the lower edge of said slots formed by a downwardly sloping L-shaped baffle extending from within said first section into said second section, the upper portion of said L-shaped baffle being parallel to and spaced apart from said partition and forming an open elongated passageway communicating with said slot, means for introducing a gaseous material to said second zone, means for introducing a gaseous material to the lower portion of said first conduit and means for removing gaseous material from the upper portion of each of said chambers.

5. An apparatus comprising in combination a substantially vertical cylindrical vessel, a substantially vertical transverse partition positioned in the lower portion of said vessel forming a primary and a secondary chamber in the lower portion of said vessel, each of said chambers adapted to contain a dense fluidized bed of finely divided solid contact material having an interface between a common dilute phase of said finely divided solid contact material above said chambers, said interface located below the upper portion of said partition, means for introducing a gaseous material to the lower portion of each of said chambers for upward passage therein, at least one opening in said partition, a first baffle member projecting obliquely through said partition adjacent to the lower side of said opening therein and adapted to deflect away from said partition, a portion of said gaseous material flowing upwardly along said partition, a second baffle member associated with the upper side of said opening and forming an elongated L shaped open passageway with said first baffle member to provide for flow of finely divided solid contact material from the primary chamber to the secondary chamber in the absence of added fluidizing gas, conduit means for removing finely divided solid material from the lower portion of said secondary chamber and means for removing gaseous material from the upper portion of said vessel.

References Cited in the file of this patent

UNITED STATES PATENTS

| | | |
|---|---|---|
| 2,433,726 | Angell | Dec. 30, 1947 |
| 2,457,232 | Hengstebeck | Dec. 28, 1948 |
| 2,464,812 | Johnson | Mar. 22, 1949 |
| 2,558,194 | Orescan | June 26, 1951 |
| 2,586,705 | Palmer | Feb. 19, 1952 |
| 2,612,433 | Nicolai et al. | Sept. 30, 1952 |
| 2,671,102 | Jewell | Mar. 2, 1954 |

UNITED STATES PATENT OFFICE
CERTIFICATE OF CORRECTION

Patent No. 2,900,330                                              August 18, 1959

Joseph F. Skelly

It is hereby certified that error appears in the printed specification of the above numbered patent requiring correction and that the said Letters Patent should read as corrected below.

Column 7, line 26, for "an L shaped" read -- an elongated L shaped --.

Signed and sealed this 19th day of April 1960.

(SEAL)
Attest:

KARL H. AXLINE
Attesting Officer

ROBERT C. WATSON
Commissioner of Patents